US012672656B2

(12) United States Patent
Jilesen et al.

(10) Patent No.: US 12,672,656 B2
(45) Date of Patent: Jul. 7, 2026

(54) MOULD DRUM, SYSTEM AND METHOD FOR MOULDING AND A METHOD FOR CONFIGURING A MOULD DRUM

(71) Applicant: MAREL FURTHER PROCESSING B.V., Boxmeer (NL)

(72) Inventors: Wilhelmus Josephus Gerardus Maria Jilesen, Boxmeer (NL); Mathias Marcellus Kuijpers, Boxmeer (NL); Caz Boudri, Boxmeer (NL); Johannes Martinus Meulendijks, Boxmeer (NL)

(73) Assignee: MAREL FURTHER PROCESSING B.V., Boxmeer (NL)

( * ) Notice: Subject to any disclaimer, the term of this patent is extended or adjusted under 35 U.S.C. 154(b) by 784 days.

(21) Appl. No.: 17/912,745

(22) PCT Filed: Mar. 25, 2021

(86) PCT No.: PCT/EP2021/057755
§ 371 (c)(1),
(2) Date: Sep. 19, 2022

(87) PCT Pub. No.: WO2021/191355
PCT Pub. Date: Sep. 30, 2021

(65) Prior Publication Data
US 2023/0147945 A1     May 11, 2023

(30) Foreign Application Priority Data
Mar. 26, 2020     (NL) ...................................... 2025209

(51) Int. Cl.
*B29C 67/00*     (2017.01)
*A22C 7/00*     (2006.01)
*F16D 1/10*     (2006.01)

(52) U.S. Cl.
CPC ...... *A22C 7/0069* (2013.01); *F16D 2001/103* (2013.01)

(58) Field of Classification Search
CPC .................................................... A22C 7/0069
See application file for complete search history.

(56) References Cited

U.S. PATENT DOCUMENTS 2,296,788 A     9/1942   Horstmann
8,029,266 B2   10/2011   Van Der Eerden et al.
(Continued)

FOREIGN PATENT DOCUMENTS

DE     102010004856 A1     7/2011
EP     1473534 A1     11/2004
(Continued)

OTHER PUBLICATIONS

Octaforce NPL, https://octaforce.com/gear-coupling/ (Year: 2019).*
(Continued)

*Primary Examiner* — Nicholas Krasnow
(74) *Attorney, Agent, or Firm* — Workman Nydegger

(57) ABSTRACT

A mould drum, a system for moulding comprising a mould drum, a method for moulding, and a method for manufacturing a mould drum such that the mould drum includes a mould tube defining an outer circumferential surface with groups of multiple recessed mould cavities. The mould tube has a first mould tube head end. The mould drum includes a driven flange structure arranged against the first mould tube head end, which is adapted to be driven by a mould drum drive member to rotate the mould tube about a drum rotation axis. The driven flange structure is provided with a tooth profile, and the mould tube is provided with a meshing tooth profile, both tooth profiles meshing with each other and thereby being able to transfer torque from the driven flange structure to the mould tube.

13 Claims, 10 Drawing Sheets

(56) References Cited

U.S. PATENT DOCUMENTS

| | | | |
|---|---|---|---|
| 2007/0029362 A1 | 2/2007 | Caillaud et al. | |
| 2009/0134544 A1 | 5/2009 | Van Der Eerden et al. | |
| 2018/0255824 A1* | 9/2018 | Meskendahl | B08B 1/34 |
| 2018/0281242 A1* | 10/2018 | Lindee | A22C 7/0038 |

FOREIGN PATENT DOCUMENTS

| | | | |
|---|---|---|---|
| EP | 3243389 | A1 | 11/2017 |
| JP | 2001299317 | A | 10/2001 |
| WO | 0030458 | A1 | 6/2000 |
| WO | 2004002229 | A2 | 1/2004 |
| WO | 2005107481 | A2 | 11/2005 |
| WO | 2012012581 | A1 | 1/2012 |

OTHER PUBLICATIONS

Search Report from Chinese Application No. 202180022567.7, Feb. 9, 2023.
Office Action from Chinese Application No. 202180022567.7, Feb. 11, 2023.
The Netherlands Search Report from corresponding Netherlands Application No. NL 2025209, Dec. 16, 2020.
International Search Report from corresponding PCT Application No. PCT/EP2021/057755, Jun. 18, 2021.

\* cited by examiner

MOULD DRUM, SYSTEM AND METHOD FOR MOULDING AND A METHOD FOR CONFIGURING A MOULD DRUM

BACKGROUND

The present invention relates to a mould drum, a system and a method for moulding, and a method for configuring a mould drum and a mould tube.

Mould drums for moulding food products are known in the art and have been commercially offered by Marel under the name RevoPortioner for over a decade. The drum is e.g. described in WO2005107481 of the same applicant. Such a mould drum is configured for use in a system for moulding food products from a pumpable foodstuff mass of one or more food starting materials. The mould drum has a mould tube made of porous material. The mould tube defines an outer circumferential surface wherein groups of multiple recessed mould cavities are provided. Each mould cavity defines a shape of the product which is to be moulded. The mould cavities each have an opening in the outer circumferential surface of the mould drum for the introduction of foodstuff mass into the mould cavity and for the ejection of the moulded product. The mould tube has a first and second mould tube head end. The mould drum further comprises a driven flange structure, which is arranged against the first mould tube head end. The driven flange structure is adapted to be driven by a mould drum drive member, to rotate the mould tube about a drum rotation axis. In operation, the mould drum is rotatably supported on a frame of the RevoPortioner to revolve about the drum rotation axis in a direction of rotation, which is commonly in horizontal orientation.

Examples of the products to be moulded with the mould drum of the invention are hamburgers, nuggets, schnitzels and three-dimensional products such as tenderloins, steaks, (meat) balls and fillets. An appropriately designed mould drum can handle different foodstuff masses, such as red and white meat, fish, potato and other plant-based foodstuff masses, but also edible fungi-based masses, soy-based masses and edible insect-based masses and the like. Often the mass is ground, e.g. ground meat.

In embodiments, a mass feed member is provided which, in operation, is arranged at a fill position relative to the outer circumferential surface of the mould tube, said mass feed member being adapted to transfer foodstuff mass into passing mould cavities of the mould drum, said mass forming a food product in said mould cavity. Such a mass feed member is e.g. described in WO2004/002229 of the same applicant. The mass feed member exerts a filling pressure on a portion of the mass while the mould cavity is being filled with this portion. This pressure can be as high as several tonnes, even more than 10 tonnes. These pressures act on the mould drum, and result in particular in downward bending of the mould drum during filling the cavities. The mould drum passes the mass feed member in a sealing manner to prevent loss of starting material. As a result, there is friction between the mass feed member and the mould drum. This filling pressure and friction require additional torque to be applied to the mould drum, to cause rotation.

In operation, the driven flange structure is driven by a mould drum drive member. The torque created is transferred to the porous mould tube, to cause rotation of the mould drum tube about the drum rotation axis. The driven flange structure is arranged against the first mould tube head end. It is known in the art to transfer the torque by dowel pins provided between the driven flange structure and the first mould tube head end, made of porous material. To this end, holes are provided in the first mould tube head end for accommodating the dowels.

It has been noted that after long time use, stresses at these holes cause small cracks adjacent the holes for the dowels. Such fatigue cracks may occur after extended lifetime. In addition, when extending the length of the drum from conventional 700 mm or smaller, to 1000 mm or longer, additional torque is to be transferred to the drum. This additional torque causes additional stresses and may accelerate the fatigue process causing the cracks.

From WO2012/012581 a solid mold shell is known, disposed around a solid mold cylinder and engaging with the solid mold cylinder to form mold cavities, such that the mold shapes are situated over porous inserts. The mold shell is held in place over the mold cylinder with base members on either end of the rotary cylinder, to prevent the mold shell from sliding off the mold cylinder. The cylindrical mold shell has edges that are keyed so as to interlock with flanges on base members when the mold shell and the base members are engaged. The base members comprise a central opening for a shaft which provides the axis of rotation. The base members engage the mold cylinder through the use of hollow dowels which come in contact with air channels in the mold cylinder.

SUMMARY

The aim of a first aspect of the invention is to provide a configuration of a mould drum wherein the mould tube of porous material has an elongated lifetime.

This aim is achieved in that the driven flange structure is provided with a tooth profile, and the mould tube is provided with a meshing tooth profile, both tooth profiles meshing with each other and thereby being able to transfer torque from the driven flange structure to the mould tube. This configuration of transferring the torque from the driven flange structure to the porous mould tube is more reliable and less prone to cracks.

An advantage of this configuration is that the provision of holes in the first mould tube head end for accommodating the dowels is no longer necessary, which is in particular difficult in porous material. It has been proven more durable to provide a tooth profile in the first mould tube head end.

Another advantage of this construction is that the transfer of torque occurs more even with meshing teeth than with dowels, and hence with a more even load distribution than with dowels wherein the loads can be locally high. Also, with meshing teeth the surface area over which the load is distributed is larger. This results in an increased lifetime of the mould drum, in particular of the porous material of the drum.

According to the invention, the meshing tooth profile provided in the mould tube is formed by a series of recesses in the porous material of the mould tube, wherein these recesses are complementary to protrusions provided in the driven flange structure.

According to the invention, the recesses are provided in an inner tube surface opposite the outer circumferential surface. The recesses are concealed by the outer circumferential surface. This configuration is very advantageous in the transfer of torque, as it prevents excessive loads and stress on the mould tube made of porous material. The configuration provides a robust support structure for the tooth profile in the porous mould tube, diminishing the load and stress on the tooth profile, and preventing damage thereof.

Advantageously, the meshing tooth profile provided in the mould tube is formed in the close vicinity or at the first mould tube head end.

Advantageously, the recess is open at the first mould tube head end. It is also conceivable that the recesses are formed as cavities having an encircling wall formed by the mould tube.

In embodiments, the driven flange structure comprises a flange portion extending inside the mould tube and a cap portion abutting the first mould tube head end. The cap portion may form at least part of an axial mould drum end face. The tooth profile of the driven flange structure is preferably formed by a series of protrusions, radially extending from the flange portion of the driven flange structure, wherein preferably the cap portion has a diameter larger than the protrusions so as to conceal one side of the tooth profile. This configuration provides a solid support structure for the tooth profile, diminishing the load and stress on the tooth profile, preventing damage thereof.

Advantageously, the series of protrusions of the driven flange structure mesh with the series of recesses in the mould tube. This meshing results in abutting walls of the recesses. Advantageously, the protrusions do not abut a wall of the recess parallel to the first mould tube head end. Such abutment may cause friction while transmitting torque.

Advantageously, each of the tooth profiles comprises a multitude of e.g. 10-30 teeth.

In embodiments, the driven flange structure is provided with drive bushings, adapted to be engaged by the mould drum drive member, e.g. by complementary drive rings of the mould drum drive member. Alternative configurations for transferring torque from the mould drum drive member to the driven flange structure are also conceivable.

In embodiments, the mould drum is provided with a support surface, allowing the mould drum to be supported by a rotatable axis. Bearing elements are possibly provided between the support member and the bearing surface. It is also conceivable that the mould drum is provided with a bearing surface, allowing the mould drum to rotate about a support member of the system for moulding.

Possibly, the support surface is formed at the driven flange structure. E.g., the driven flange structure is ring-shaped with a support surface at the inside of the ring, allowing a support member to extend into the driven flange structure, and possible also into the mould tube. Alternatively, the driven flange structure has an axle protruding opposite the mould tube, with an outer support surface which is supported by a support member.

In embodiments, the mould drum further comprises a support flange, provided at a side of the mould drum opposite the driven flange structure. It is conceivable that a support surface of the mould drum is provided at the support flange.

The support flange is advantageously arranged against the second mould tube head end. It is conceivable that the support flange is mounted to the second mould tube head end, e.g. via welding or bolts. It is also conceivable that the support flange is provided with a tooth profile, and the mould tube, preferably in the vicinity of or at the second mould tube head end, is provided with a meshing tooth profile, both tooth profiles meshing with each other.

In embodiments, the support flange comprises a flange portion extending inside the mould tube and a cap portion, having a larger diameter, abutting the second mould tube head end. The cap portion of the support flange forms at least part of a second axial mould drum end face.

The surface of the mould tube head ends, perpendicular to the outer circumferential surface, is preferably smooth, allowing the abutment of a flange, in particular a cap portion of the flange. Advantageously, the mould tube has a cylindrical shape, and the head ends of the mould tube are ring-shaped.

The mould drum of the invention has a mould tube defining an outer circumferential surface wherein groups of multiple recessed mould cavities are provided.

The mould tube has a permeable structure, made of porous material, e.g. of sintered metal with a porous structure, such as stainless steel, aluminium, copper or bronze, and comprises passages with fine openings opening out at the one or more mould cavities. It is also conceivable that the mould tube comprises one or more polymers.

Known sinter powder has a particle size of 100 pm-50µ, which has been sintered. Possible, isostatic pressing and/or coaxial compression is applied to produce a mould tube having a permeable volume.

The mould tube has a porosity typically between 3-30%, advantageously between 5-15%, having fine openings with an effective pore size of 1-50 pm. The fine openings, or minute openings, are generally referred to as 'pores' in relation to a porous volume.

It is also conceivable that a mould tube, is made from a solid, non-porous or closed celled material, e.g. provided in a machining step with fine passages having fine openings that open out in the cavity, for example micropassages or nanopassages.

Possibly, the mould tube is made using a rapid prototyping technique, e.g. metal or polymer 3D printing. Preferably fine passages of the mould body are formed in the rapid prototyping process, so, as preferred, without requiring a further machining step to form these passages for an ejection fluid. For example, in a 3D printed mould tube the average diameter, e.g. over the length thereof, of such passages is between 0.05 mm and 0.8 mm, e.g. between 0.05 and 0.3 mm. The distance between adjacent passages may for example be between 1 mm to 5 mm. It is also conceivable that the fine openings are created by perforation of a printed mould tube, e.g. using laser drilling, high pressure jet drilling, or the like.

For example, using a rapid prototyping technique fine passages are made in the mould tube that taper, so become narrower from an inlet side thereof to the fine opening in the surface of the mould cavity, e.g. over the entire length of the passage or over a portion thereof. This production is preferably done without requiring a further machining step to form these passages for an ejection fluid.

The mould tube is permeable for fluid, in particular for ejection fluid that is used for assisting in the ejection of moulded products from the mould cavities. The permeability serves to allow passage of an ejection fluid through the mould tube to cause the ejection of the product. It is preferred that the fine openings of the passages in the surface of the mould cavity are too small for the foodstuff mass to enter significantly into the passages during production of the food product.

A commonly used fluid to assist in the ejection removal of a product from a mould cavity is air, in particular compressed air. Other ejection fluids, or mixtures of fluids, are also conceivable, such as water, edible oil, $CO_2$, preferably being compressed.

It is also conceivable, and known in the art, that the openings for the ejection fluid are used for cleaning of the mould drum by a cleaning fluid that is flushed through the openings. This is for example done with the mould drum being removed from the installation, e.g. in a dedicated cleaning device for the mould drum. Such a cleaning fluid may include water, chemical fluids, e.g. including bleach, disinfectants, bacteriostatic agents, etc.

In the mould tube of the mould drum of the invention groups of multiple recessed mould cavities are provided.

In embodiments, as known in the art, the mould tube is provided with fluid-tight barriers between one or more mould cavities and/or between lanes of mould cavities. This allows ejection fluid, such as compressed air, to be provided to a group of mould cavities from which food products are to be ejected simultaneously, without ejection fluid passing to mould cavities at the other side of the barrier. Such a fluid-tight barrier is e.g. provided by locally impregnating the permeable body with a resin as is known in the art. Alternatively solid material barrier members can be integrated into permeable bodies or permeable bodies being held in solid barrier members.

In embodiments, the mould cavities are arranged in the outer circumferential surface in a mould cavities pattern with lanes of cavities. Herein, in a lane, cavities are arranged at multiple longitudinal positions when seen in longitudinal direction of the mould drum. A lane may be straight, so parallel to the mould drum axis, or helical as is known in the art.

In embodiments, multiple lanes are provided on the drum when seen in circumferential direction. In embodiments, the drum surface may comprise 4, 5, 6, 7, 8, 9, 10, 11, 12 or more lanes of cavities, predominantly depending on the size of the products. In a lane multiple cavities are arranged, e.g. 2, 3, 4, 5, 6, 7, 8 or even more. Obviously, the length of the drum and the size of the cavities impacts the number of cavities in a lane. For example, the drum has a length between 50 and 120 centimetres, e.g. 60, 70, or 100 centimetres.

In general, it is envisaged that in embodiments food products with a thickness between for example 3 and 40 mm can be produced, in particular between 10 and 30 mm Product length and/or width, or diameter, may for example vary between 5 and 250 mm, e.g. diameters of between 8 and 15 centimetres, e.g. for hamburger meat patties.

The length of the mould drum in a longitudinal direction is in practical embodiments between 400-1200 mm, e.g. 700 mm or 1000 mm.

The outer circumferential surface of the mould tube is advantageously 80-100% fluid tight, to prevent (ejection) fluid to escape via the outer circumferential surface instead of via the mould cavities. The first and second mould tube head ends are preferably also fluid tight, to prevent fluid to escape via the head ends instead of via the mould cavities.

In embodiments, the surface is made fluid tight upon production of the mould tube. It is also conceivable that the outer surface was made porous, followed by a sealing step to make the curved outer surface fluid tight. For example, a burnish treatment using one or more rollers is applied, creating a sealed layer, e.g. of approximately 1 mm Other mechanical deformation techniques used to provide the fluid-tight barrier include mechanical polishing, grinding or media blasting. Yet alternatively, a fluid-tight barrier is provided at the outer surface with a different technique, such as impregnation with a resin or coating. With 3D printing techniques it is also possible to make part of the body porous, and another part, such as the outer surface, solid and fluid-tight.

In embodiments, a tubular inner member is provided inside the mould tube. The tubular inner member has a first and second inner member head end, an outer surface and an opposed inner surface. Advantageously, the outer surface of the tubular inner member is provided adjacent an inner surface of the mould tube.

The tubular inner member can be provided for structural support of the mould tube.

In embodiments, the tubular inner member is non-permeable and multiple fluid channels are defined between the tubular inner member and the mould tube, such that each of the multiple fluid channels is below a group of mould cavities which is to be ejected simultaneously. For example, the fluid channels extend in the longitudinal direction between series of cavities.

The channels are e.g. delimited by (part of) the non-permeable tubular inner member. In alternative embodiments, seals are provided between the channels.

The fluid channels extend from fluid inlets. At least one ejection fluid inlet is associated with a group of mould cavities from which moulded food products are to be ejected simultaneously. In embodiments, one ejection fluid inlet per lane of cavities is provided, preferably at a head end, also called axial end, of the drum. Optionally, ejection fluid inlets common to the same lane are provided at opposed head ends of the drum. In alternative embodiments, for example, one ejection fluid inlet per cavity is provided. It is also conceivable that one or more ejection fluid inlets are provided in the outer circumferential surface of the mould tube, e.g. in proximity to a head end thereof.

One or more fluid channels extend from each ejection fluid inlet to the group of mould cavities. The one or more channels provide communication from the at least one ejection fluid inlet via the channels and via the mould tube into the mould cavities to assist in ejection of the moulded products from the group of mould cavities.

In embodiments, the driven flange structure is provided with fluid channels, having a fluid inlet provided in a surface of the driven flange structure. The fluid channels in the driven flange structure are preferably aligned with the fluid channels between the tubular inner member and the mould tube, allowing fluid communication from a fluid source arranged against a driven flange surface, e.g. at the first mould drum end face, via a fluid channel in the driven flange structure to the fluid channels below the series of mould cavities, and via the mould tube to the mould cavity.

In alternative embodiments, it is conceivable that fluid is allowed to enter the mould tube from a tray provided inside the mould tube, similar to the configuration known from WO0030458.

In embodiments, the mould drum further comprises a tubular inner member provided inside the mould tube, the tubular inner member comprising a flange portion being attached to and forming part of the driven flange structure.

In embodiments, the mould drum further comprises:

a support flange arranged against the second mould tube head end, such that the mould tube is sandwiched between the driven flange structure and the support flange; and multiple tension rods, provided under pretension, extending between the driven flange structure and the support flange.

Preferably, the mould drum further comprises a tubular inner member provided inside the mould tube. Possibly, the tubular inner member comprises a flange portion being attached to and forming part of the driven flange structure. Possibly, the multiple tension rods extend through the tubular inner member, between the driven flange structure and the support flange. Such an inner member may also attribute to the bending and torsional stiffness. The flange portion of the tubular inner member is e.g. mounted to the driven flange structure by bolts, or welded thereto.

In embodiments, the tubular inner member is non-permeable and multiple fluid channels are defined between the tubular inner member and the mould tube, such that each of the multiple fluid channels is below a group of mould cavities. In view of this function, and with the presence of tension rods, the inner member does not have to be dimensioned to provide bending and torsional stiffness.

In embodiments, a gap is provided between the tubular inner member and the support flange. This gap provides compensation for differences in expansion between the mould tube, tubular inner member and tension rods.

In embodiments of the invention, the mould drum is configured for use in a system for moulding food products from a pumpable foodstuff mass, the mould drum comprising:

a mould tube defining an outer circumferential surface wherein groups of multiple recessed mould cavities are provided, the mould tube having a first and second mould tube head end, wherein preferably the outer circumferential surface is fluid tight;

a tubular inner member provided inside the mould tube, wherein the tubular inner member is non-permeable and multiple fluid channels are defined between the tubular inner member and the mould tube, such that each of the multiple fluid channels is below a group of mould cavities;

a driven flange structure arranged against the first mould tube head end, which is adapted to be driven by a mould drum drive member to rotate the mould tube about a drum rotation axis;

a support flange arranged against the second mould tube head end;

characterized in that the driven flange structure is provided with a tooth profile, and the mould tube is provided with a meshing tooth profile, both tooth profiles meshing with each other and thereby being able to transfer torque from the driven flange structure to the mould tube.

The invention further relates to a system for moulding food products from a pumpable foodstuff mass, which system comprises:

a frame, a mould drum according to one or more of the claims, being rotatably supported by the frame about the drum rotation axis, a mould drum drive member which, in operation, drives the driven flange structure to rotate the mould drum.

In embodiments, a mass feed member is provided which, in operation, is arranged at a fill position relative to the outer circumferential surface of the mould tube, said mass feed member being adapted to transfer foodstuff mass into passing mould cavities of the mould drum, said mass forming a food product in said mould cavity.

Such a mass feed member is e.g. described in WO2004/002229 of the same applicant. The mass feed member exerts a filling pressure on a portion of the mass while the mould cavity is being filled with this portion. This pressure can be as high as several tonnes, even more than 10 tonnes. These pressures act on the mould drum, and result in particular in downward bending of the mould drum during filling the cavities. The mould drum passes the mass feed member in a sealing manner to prevent loss of starting material. As a result, there is friction between the mass feed member and the mould drum. This filling pressure and friction require additional torque to be applied to the mould drum, to cause rotation.

The invention further relates to a method for moulding food products from a pumpable foodstuff mass, wherein use is made of a system for moulding food products from a pumpable foodstuff mass according to one or more of the claims.

The invention further relates to a method for configuring a mould drum for use in a system for moulding products from a pumpable foodstuff mass, the method comprising the steps of:

providing a driven flange structure with a tooth profile, which driven flange structure is adapted to be driven by a mould drum drive member to rotate the mould tube about a drum rotation axis;

providing a mould tube defining an outer circumferential surface wherein groups of multiple recessed mould cavities are provided, the mould tube having a first and second mould tube head end, the mould tube being provided with a meshing tooth profile, preferably in the close vicinity of or at the first mould tube head end;

arranging the driven flange structure against the first mould tube head end, such that the tooth profile of the driven flange structure and the tooth profile of the first mould tube head end mesh with each other, and thereby being able to transfer torque from the driven flange structure to the mould tube.

The present invention further relates to a mould tube for a mould drum configured for use in a system for moulding food products from a pumpable foodstuff mass, the mould tube defining an outer circumferential surface wherein groups of multiple recessed mould cavities are provided, the mould tube having a first and second mould tube head end; the mould tube being provided with a meshing tooth profile, meshing a tooth profile of a driven flange structure and thereby being able to transfer torque from the driven flange structure to the mould tube.

The disclosure further relates to a mould drum configured for use in a system for moulding food products from a pumpable foodstuff mass, the mould drum comprising:

a permeable mould tube defining an outer circumferential surface wherein groups of multiple recessed mould cavities are provided, the permeable mould tube having a first and second permeable mould tube head end;

a driven flange structure arranged against the first permeable mould tube head end, which is adapted to be driven by a mould drum drive member to rotate the mould tube about a drum rotation axis;

characterized in that the driven flange structure is provided with a tooth profile, and the permeable mould tube is provided with a meshing tooth profile, both tooth profiles meshing with each other and thereby being able to transfer torque from the driven flange structure to the permeable mould tube.

An advantage of this configuration is that the provision of holes in the first mould tube head end for accommodating the dowels is no longer necessary. It has been proven to more durable to provide a tooth profile in the first mould tube head end.

Optionally, the meshing tooth profile is provided in the permeable mould tube is formed by a series of recesses in the permeable mould tube, wherein these recesses are complementary to protrusions provided in the driven flange structure. Alternative configurations of meshing tooth profiles are also conceivable, e.g. wherein both the flange structure and the permeable mould tube have meshing protrusions.

In a possible configuration wherein the permeable mould tube is provided with a series of recesses, the recesses are preferably provided in an inner tube surface opposite the outer circumferential surface, and preferably at least partially being concealed by the outer circumferential surface. This configuration is very advantageous in the transfer of torque, as it prevents excessive loads and stress on the permeable outer tube. The configuration provides a solid support structure for the tooth profile, diminishing the load and stress on the tooth profile, preventing damage thereof.

It is foreseen that embodiments described above can be combined with such a mould drum.

A second aspect of the invention relates to a mould drum configured for use in a system for moulding food products from a pumpable foodstuff mass, the mould drum comprising:

a mould tube made of porous material, the mould drum defining an outer circumferential surface wherein groups of multiple recessed mould cavities are provided, the mould tube having a first and second mould tube head end;

a driven flange structure arranged against the first mould tube head end, which is adapted to be driven by a mould drum drive member to rotate the mould tube about a drum rotation axis;

a support flange arranged against the second mould tube head end, such that the mould tube is sandwiched between the driven flange structure and the support flange;

and wherein multiple tension rods are provided under pretension, the tension rods extending between the driven flange structure and the support flange.

The advantage of tension rods is to provide stiffness to the mould drum. In operation, mass is fed to the mould drum under pressure. Sometimes, also a fixing pressure is applied to the mass in the mould cavity. In addition, in embodiments a plate is provided under pressure against the peripheral drum surface, so as to ensure sealing and prevent leakage of mass out of the mould cavity. Such a mass feed member is described in WO2004/002229 of the same applicant. This pressure can be as high as several tonnes, even more than 10 tonnes. These pressures act on the mould drum, and result in particular in downward bending of the mould drum during filling the cavities. With the tension rods, bending stiffness is provided to the mould drum, in combination with a relatively fragile mould tube made of porous material.

The tension rods are provided under pretension, advantageously only causing elastic deformation of the material, not causing plastic deformation. This allows the tension rods to compensate for elongation during bending of the mould drum in operation, and/or so as to compensate for differences in expansion in relation to temperature changes between the mould tube and tension rods.

In embodiments of the second aspect of the invention, the driven flange structure is provided with a tooth profile, and the mould tube is provided with a meshing tooth profile, both tooth profiles meshing with each other and thereby being able to transfer torque from the driven flange structure to the mould tube.

In alternative embodiments, dowels are provided between the driven flange structure and the first mould tube head end to transfer torque from the driven flange structure to the mould tube.

In embodiments, nuts are provided at the side of the support flange, which nuts are able to pretension the tension rods. Advantageously, the tension rods extend through the support flange.

In embodiments, the mould drum further comprises a tubular inner member provided inside the mould tube. Possibly, the tubular inner member comprises a flange portion being attached to and forming part of the driven flange structure. Possibly, the multiple tension rods extend through the tubular inner member, between the driven flange structure and the support flange. Such an inner member may also attribute to the bending and torsional stiffness. The flange portion of the tubular inner member is e.g. mounted to the driven flange structure by bolts, or welded thereto.

In embodiments of the second aspect of the invention, the tubular inner member is non-permeable and multiple fluid channels are defined between the tubular inner member and the mould tube, such that each of the multiple fluid channels is below a group of mould cavities. In view of this function, and with the presence of tension rods, the inner member does not have to be dimensioned to provide bending and torsional stiffness.

In embodiments, a gap is provided between the tubular inner member and the support flange. This gap provides compensation for differences in expansion between the mould tube, tubular inner member and tension rods.

The invention further relates to a system for moulding food products from a pumpable foodstuff mass, which system comprises:

a frame, a mould drum configured for use in a system for moulding food products from a pumpable foodstuff mass, the mould drum comprising:

a mould tube defining an outer circumferential surface wherein groups of multiple recessed mould cavities are provided, the mould tube having a first and second mould tube head end;

a driven flange structure arranged against the first mould tube head end, which is adapted to be driven by a mould drum drive member to rotate the mould tube about a drum rotation axis;

a support flange arranged against the second mould tube head end, such that the mould tube is sandwiched between the driven flange structure and the support flange;

multiple tension rods are provided under pretension, the tension rods extending between the driven flange structure and the support flange;

a mould drum drive member which, in operation, drives the driven flange structure to rotate the mould drum.

In embodiments, the system further comprises a mass feed member which, in operation, is arranged at a fill position relative to the outer circumferential surface of the mould tube, said mass feed member being adapted to transfer foodstuff mass into passing mould cavities of the mould drum, said mass forming a food product in said mould cavity.

The invention further relates to a method for moulding food products from a pumpable foodstuff mass, wherein use is made of a system for moulding food products from a pumpable foodstuff mass, which system comprises:

a frame, a mould drum a mould drum configured for use in a system for moulding food products from a pumpable foodstuff mass, the mould drum comprising:

a mould tube defining an outer circumferential surface
wherein groups of multiple recessed mould cavities are
provided, the mould tube having a first and second
mould tube head end;

a driven flange structure arranged against the first mould
tube head end, which is adapted to be driven by a mould
drum drive member to rotate the mould tube about a
drum rotation axis;

a support flange arranged against the second mould tube
head end, such that the mould tube is sandwiched
between the driven flange structure and the support
flange;

multiple tension rods are provided under pretension, the
tension rods extending between the driven flange struc-
ture and the support flange;

a mould drum drive member which, in operation, drives
the driven flange structure to rotate the mould drum.

The invention further relates to a method for configuring
a mould drum for use in a system for moulding products
from a pumpable foodstuff mass, the method comprising the
steps of:

providing a driven flange structure which is adapted to be
driven by a mould drum drive member to rotate the
mould tube about a drum rotation axis;

providing a mould tube defining an outer circumferential
surface wherein groups of multiple recessed mould
cavities are provided, the mould tube having a first and
second mould tube head end;

providing a support flange;

arranging the driven flange structure against the first
mould tube head end and arranging the support flange
against the second mould tube head end, such that the
mould tube is sandwiched between the driven flange
structure and the support flange;

providing multiple pre-tensioned tension rods, mounting one end of each of the tension rods to the driven
flange structure and the opposite end of each of the
pre-tensioned tension rods to the support flange.

BRIEF DESCRIPTION OF THE DRAWINGS

The invention is further elucidated in relation to the
drawings, in which:

FIG. 2c shows a perspective cross sectional view of the
mould drum of FIG. 2a;

FIG. 2d shows an alternative perspective cross sectional
view of the mould drum of FIG. 2a;

FIG. 2e shows a head-end view of the mould drum of FIG.
2a;

FIG. 2f shows a cross sectional view of the mould drum
of FIG. 2a;

FIG. 3a shows a read side of the driven flange of the
mould drum of FIG. 2a in detail;

FIG. 3b shows a front side of the driven flange of FIG. 3a;

FIG. 3c shows the mould tube of the mould drum of FIG.
2a in detail;

FIG. 3d shows the tubular inner member forming part of
the driven flange structure;

FIG. 3e shows the tubular inner member forming part of
the driven flange structure of FIG. 3d in a side view;

FIG. 3f shows the tubular inner member and mould tube,
prior to assembly of the driven flange;

BRIEF DESCRIPTION OF VARIOUS
EMBODIMENTS

Figure 1:
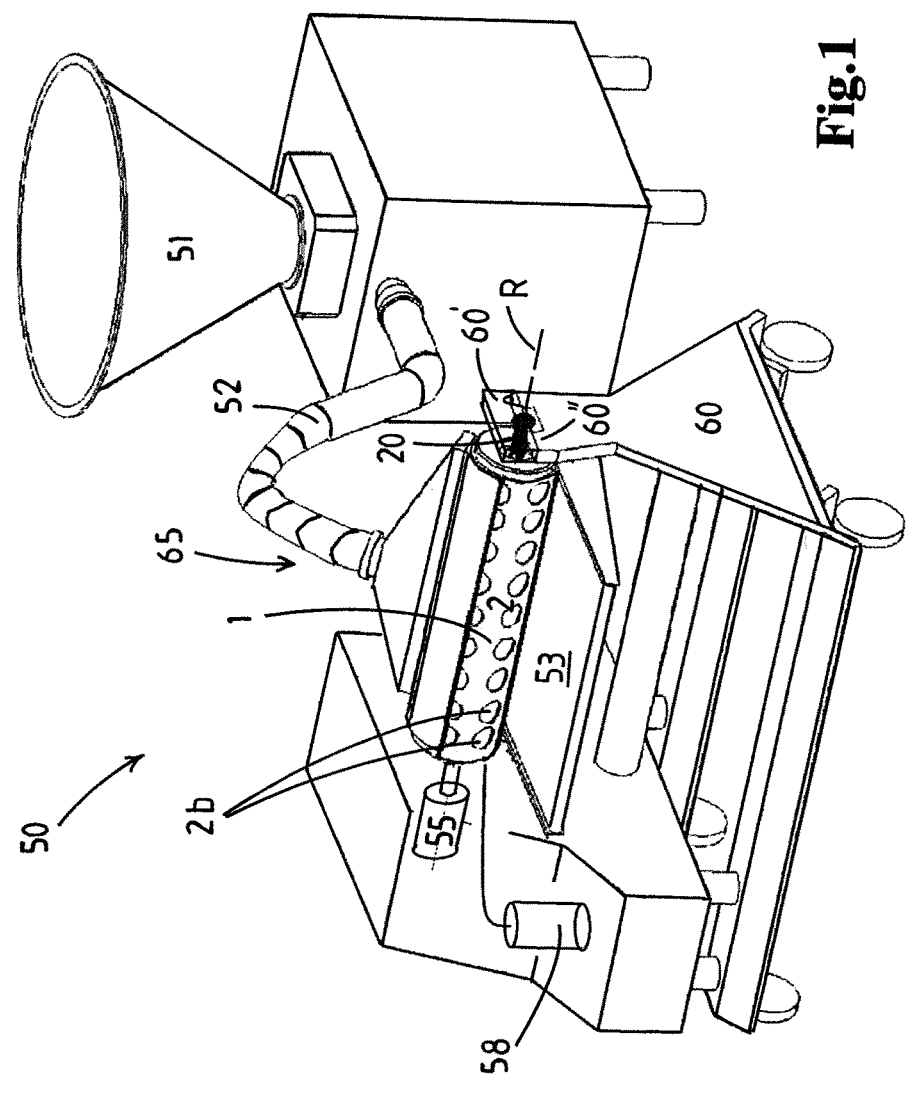
FIG. 1 shows a perspective view of a system for mould
food products according to both aspects of the present
invention.

In FIG. 1 a system 50 is shown, for moulding food
products from a pumpable foodstuff mass. The pumpable
foodstuff mass is received in a hopper 51, from which the
foodstuff mass is possibly further processed, e.g. grinded
and/or mixed, and subsequently pumped via a hose 52 to a
mass feed member 65. The mass feed member is preferably
a mass feed member as known from WO2004/002229.

The system 50 further comprises a frame 60, supporting
an axle 20 which supports a mould drum 1 according to the
invention. The mould drum 1 is rotatably supported onto the
axle 20 about a drum rotation axis R. At one side of the
mould drum 1, a mould drum drive member 55 is provided,
which, in operation, rotates the axle 20 and the mould drum
1 supported thereby. At the opposed side of the drum, a
support surface 60" provides support for the rotating axle 20
extending through the mould drum 1. This will be explained
in more detail later. A frame part 60' is provided, which is
detachable to allow the mould member 1 to be removed from
the axle 20 and another mould member to be placed onto the
axle 20.

The mould drum has a mould tube 2 defining an outer
circumferential surface wherein groups of multiple recessed
mould cavities 2b are provided. The mould tube is perme-
able for fluid, in particular for ejection fluid that is used for
assisting in the ejection of moulded products from the mould
cavities. The permeability serves to allow passage of an
ejection fluid through the mould tube to cause the ejection of
the product. In FIG. 1, such an ejection fluid source 58 is
shown, providing ejection fluid to fluid inlets provided at a
head end of the mould drum. The ejected moulded products
will drop onto a conveyor 53.

In FIGS. 2a-2f and FIGS. 3a-3f a mould drum 1 according
to the invention is shown in alternative views. In FIGS. 2a
and 2b and FIGS. 3a-3f, the mould drum 1 is not yet
assembled, showing the inventive details.

Mould drum 1 is configured for use in a system for
moulding food products from a pumpable foodstuff mass.
The mould drum 1 has a drum rotation axis R. The shown
embodiment of the mould drum comprises an elongated,
mould tube 2. The mould tube defines an outer circumfer-
ential surface 2a of the mould drum 1, wherein groups of
multiple recessed mould cavities 2b are provided. The outer
circumferential surface is smooth to allow rotation past mass
feed means. Furthermore, the outer circumferential surface is essentially fluid tight, not allowing the passage of fluid, so as to direct the fluid to the recessed mould cavities 2b.

In the shown embodiment, the mould cavities are oriented in lanes, parallel to the drum rotation axis R. In the shown embodiment, a multitude of mould cavities is provided, which are circular, and all have the same depth. Other shapes are also possible, e.g. meat balls, sausages, Christmas trees, etc. etc. More or less cavities in a lane are possible, and it is also conceivable that the cavities are not provided in lanes parallel to the drum rotation axis R.

The mould tube 2 has a first mould tube head end 2c and a second mould tube head end 2d. Opposite the outer circumferential surface 2a is an inner surface 2e of the mould tube.

The mould tube 2 has a thickness exceeding that of the cavities 2b. In embodiments, the mould tube 2 is thin and supported by a tubular inner member 5, shown in detail in FIGS. 3d and 3e, which will be elucidated later. It is also conceivable that the mould tube has a thickness so as to withstand the forces acting thereon, such as the pressure of the pressurized foodstuff mass.

According to the present invention, the mould tube 2 is provided with a tooth profile 2t, here at the first mould tube head end 2c. The tooth profile 2t provided in the mould tube 2 is here formed by a series of recesses 2r in the mould tube, provided in an inner tube surface 2e opposite the outer circumferential surface 2a and at least partially being concealed by the outer circumferential surface 2a.

In particular, in the shown embodiment are the recesses 2r open at the first mould tube head end 2c and extend for a distance of 5-50 mm into the mould tube at the inner surface 2e thereof. At the first mould tube head end 2c the recesses 2r are delimited by portions 2s of the first mould tube head end 2c. The recesses 2r are not visible from the outer circumferential surface of the mould tube 2.

In addition to tooth profile 2t, the shown mould tube 2 is provided with a tooth profile 2n at the second mould tube head end 2d. The tooth profile 2n is here formed by a series of recesses 2k in the mould tube, provided in an inner tube surface 2e opposite the outer circumferential surface 2a and at least partially being concealed by the outer circumferential surface 2a. Tooth profile 2n here only comprises four recesses 2k.

In the shown embodiment, the recesses 2k are open at the second mould tube head end 2d and extend for a distance into the mould tube at the inner surface 2e thereof. At the second mould tube head end 2d the recesses 2r are delimited by the second mould tube head end 2d. The recesses 2k are not visible from the outer circumferential surface 2a of the mould tube 2.

The mould drum 1 further comprises a driven flange structure 3, which is to be arranged against the first mould tube head end 2c. The driven flange structure 3 is adapted to be driven by a mould drum drive member to rotate the mould tube about the drum rotation axis R. To this end, drive bushings 15 are provided, here 5 in total, at a head end of the mould drum. In FIG. 2f, the drive bushing 15 is shown in cross section.

According to the invention, the driven flange structure 3 is provided with a tooth profile 3t, meshing with the tooth profile 2t of the mould tube, and thereby being able to transfer torque from the driven flange structure 3 to the mould tube 2.

In the shown embodiment of FIGS. 2a-3f, the driven flange structure 3 comprises a flange portion 3e which is adapted to extend inside the mould tube 2, in particular to be near an inner tube surface 2e opposite the outer circumferential surface 2a.

The tooth profile 3t of the driven flange structure 3 is formed by a series of protrusions 3d, radially extending from the flange portion 3e of the driven flange structure. These protrusions 3d have dimensions that match the recesses 2r of the mould tube 2, so as to allow the tooth profiles to mesh with each other.

The driven flange structure 3 of the shown embodiment further comprises a cap portion 3c, having a diameter larger than the protrusions so as to abut the first mould tube head end 2c. In particular, the cap portion 3c has an inner surface 3c', abutting the first mould tube head end 2c. With the cap portion 3c having a diameter larger than the protrusions 3d, the cap portion conceals a side of the tooth profile 3t. In particular, here the protrusions 3d abut an inner surface 3c' of the cap portion 3c. In the shown configuration the diameter of the cap portion 3c equals the diameter of the mould tube, together forming an outer surface of the mould drum 1.

The driven flange structure 3 further comprises an inner portion 3f, provided adjacent the flange portion 3e, which inner portion 3f is adapted to extend inside the tubular inner member 5, in particular to be near an inner surface 5e thereof. Hence, the driven flange structure has a cap portion 3c having a large diameter, an adjoining flange portion 3e having a smaller diameter and extending into the mould tube 2, and an adjoining inner portion 3f having yet a smaller diameter and extending into the tubular inner member 5.

Figures 2C, 2D, 2E, 2F:
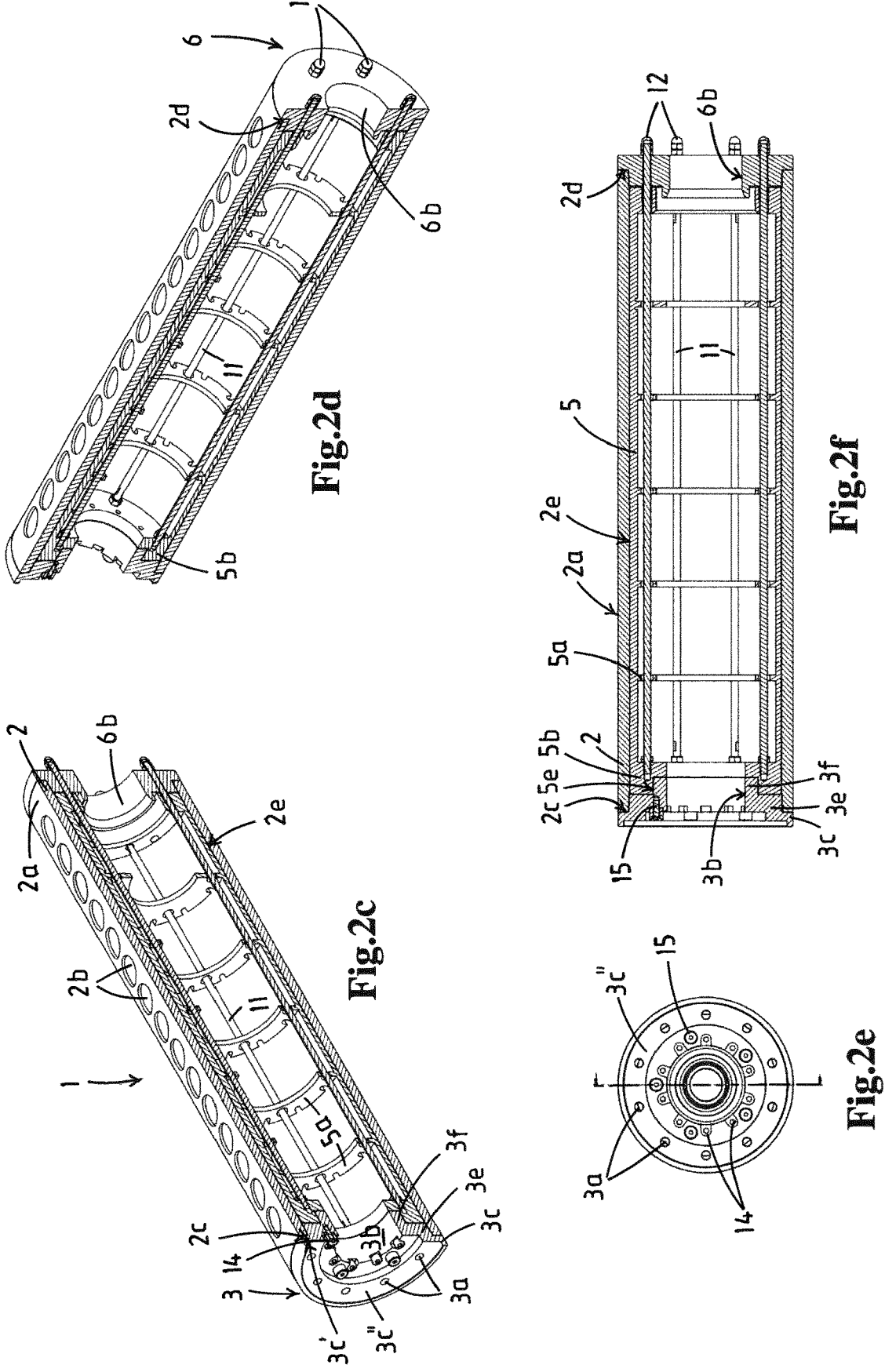
Figures 3A, 3B, 3C, 3D, 3E, 3F:
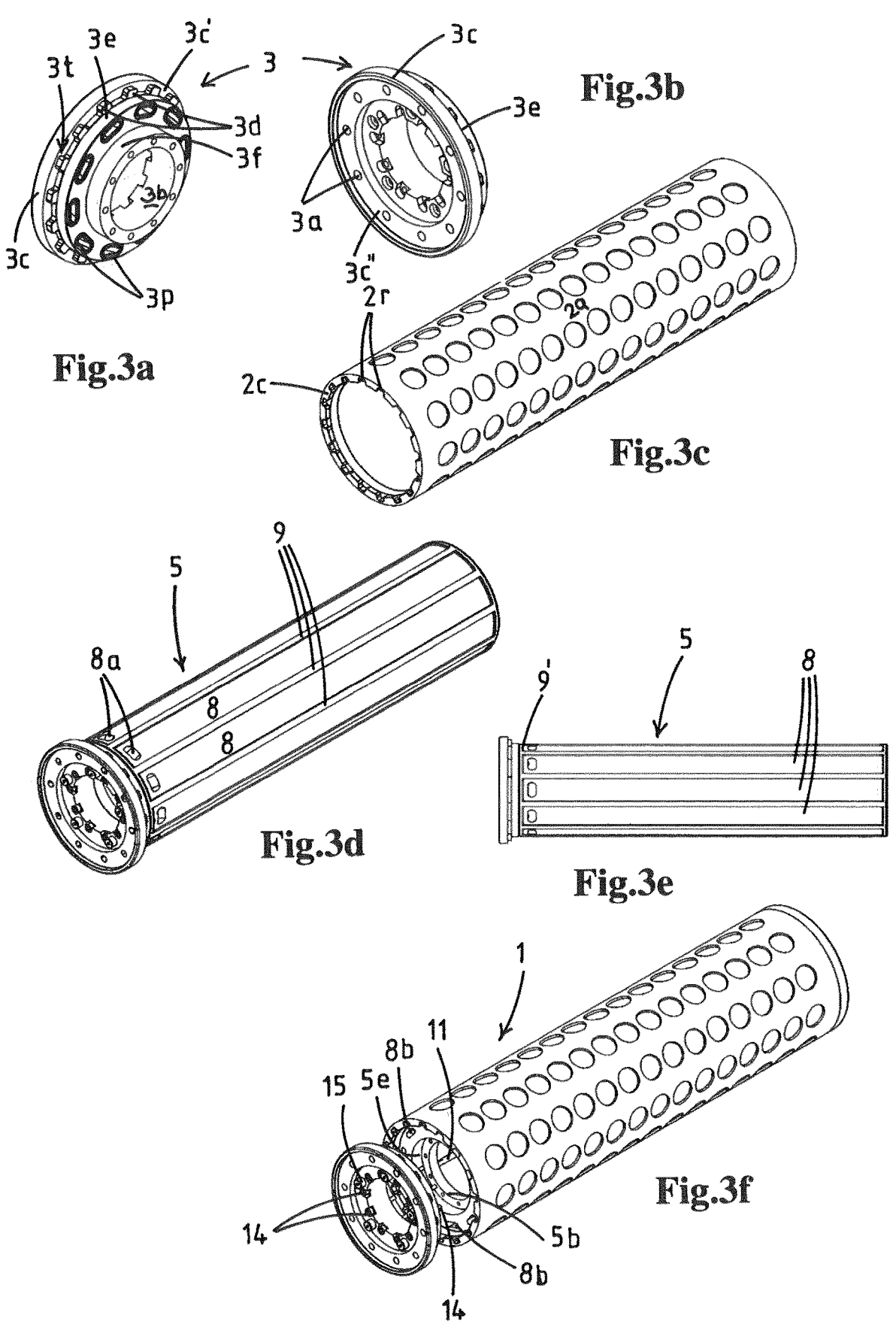

The tubular inner member 5 is thin below the mould tube 2, and comprises thickened ends allowing the tubular inner member to be connected. In particular, the tubular inner member comprises a flange portion 5b, to which the driven flange structure 3 can be attached to form part of the driven flange structure by connection bolts 14. In FIG. 3f, the parts are not yet assembled making the details visible. In FIG. 2c, the connection bolt 14 through the flange and the flange portion of the inner member is shown in cross section.

Advantageously, the mould drum is provided with a support surface, allowing the mould drum to be supported by an axle allowing the mould drum to rotate. In the shown embodiment, the driven flange structure 3 of the mould drum 1 is open-centred, defining a support surface 3b.

The mould drum 1 of the shown embodiment further comprises a support flange 6 arranged against the second mould tube head end 2d.

Similar to the driven flange structure 3, in the shown embodiment the support flange 6 is also provided with a tooth profile 6t, meshing with tooth profile 2n of the mould tube. These tooth profiles are not provided to transfer torque but only to assemble the flange to the mould tube. For this purpose only, less teeth suffice and in the shown embodiment thus the tooth profile 6t of the support flange only comprises four teeth 6d.

In the shown embodiment, the support flange 6 comprises a flange portion 6e which is adapted to extend inside the mould tube 2, in particular to be near an inner tube surface 2e opposite the outer circumferential surface 2a.

The tooth profile 6t of the support flange 6 is formed by protrusions 6d, radially extending from the flange portion 6e of the support flange. These protrusions 6d have dimensions that match the recesses 2k of the mould tube 2, so as to allow the tooth profiles to mesh with each other.

The support flange 6 of the shown embodiment further comprises a cap portion 6c, having a diameter larger than the protrusions 6d so as to abut the second mould tube head end 2*d*. In particular, the cap portion 6*c* has an inner surface 6*c*', abutting the second mould tube head end 2*d*. With the cap portion 6*c* having a diameter larger than the protrusions 6*d*, the cap portion conceals a side of the tooth profile 6*t*. In particular, here the protrusions 6*d* abut inner surface 6*c*' of the cap portion 6*c*. In the shown configuration the diameter of the cap portion 6*c* equals the diameter of the mould tube, together forming an outer surface of the mould drum 1.

In the shown embodiment of FIGS. 2*a*-3*f*, the support flange 6 of the mould drum 1 is open-centred, defining a support surface 6*b* allowing the mould drum to be supported by an axle allowing rotation of the mould member.

As indicated above, the shown mould drum further comprises a tubular inner member 5, which is provided inside the mould tube 2.

In the shown embodiment, the tubular inner member 5 is non-permeable and multiple fluid channels 8 are defined between the tubular inner member 5 and the mould tube 2, such that each of the multiple fluid channels 8 is below a group of mould cavities. In the shown embodiment, the channels are delimited by seals 9, e.g. rubber seals, separating the tubular inner member 5 from the mould tube 2, here per row of mould cavities. Here the seals 9 extend radially from the tubular inner member 5, and extend in axial direction, parallel to the drum rotation axis R. In addition, a seal 9' is provided, sealing the head ends of the fluid channels 8.

The fluid channels 8 extend from fluid inlets 8*a*. At least one ejection fluid inlet 8*a* is associated with a group of mould cavities from which moulded food products are to be ejected simultaneously. In the shown embodiment, one ejection fluid inlet per lane of cavities is provided. It follows from FIG. 3*f* that fluid inlets 8*a* are connected via channels to fluid inlets 9*b* provided at a head end of the tubular inner member 5.

Also, in the shown embodiment of FIGS. 2*a*-3*f*, the driven flange structure 3 is provided with fluid channels (not visible), having a fluid inlet 3*a* provided in an outer surface 3*c*'' of the cap portion 3*c* of the driven flange structure, and an outlet 3*p* (visible in FIG. 3*a*) to be aligned with the fluid inlets 8*b* provided at the head end of the tubular inner member 5, fluid communication is possible from a fluid source providing fluid to the opening 3*a* in the driven flange surface 3*c*'', via a fluid channel in the driven flange structure to the fluid channels 8 below the series of mould cavities 2*b*, and via the mould tube 2 to the mould cavities 2*b*.

The shown mould drum 1 comprises a driven flange structure 3 and a support flange 6, such that after assembly the mould tube 2 is sandwiched between the driven flange structure 3 and the support flange 6.

The shown mould drum 1 of FIGS. 2*a*-3*f* further comprises multiple tension rods 11, here six, provided under pretension, extending between the driven flange structure 3 and the support flange 6. In particular, in the shown embodiment, the inner member 5 comprises a flange portion 5*b* which is attached to and forms part of the driven flange structure 3. The multiple tension rods 11 extend through the tubular inner member, between the driven flange structure and the support flange 6.

In the shown embodiment the tension rods are fixed to the driven flange structure, in particular to the tubular inner member thereof. The tension rods 11 extend through the support flange 6, where they are mounted via bolts 12 to an outer surface 6*c*'' of the support flange 6.

The tension rods 11 extend through the support flange 6, where they are mounted via bolts 12 to an outer surface 6*c*'' of the support flange 6. In the shown configuration, it is visible that the tubular inner member 5 is about as thin as the mould tube 2. The inner member 5 comprises multiple radially extending reinforcement ribs 5*a*. The tension rods 11 extend through these ribs 5*a*.

From the views of FIGS. 3*c*, 3*d* and 3*f*, it is apparent that the mould drum 1 has an open centre. The flanges 3, 6 are also open-centred, allowing the mould drum to be supported by an axle. One or more surfaces of the mould drum 1 may be configured as support surfaces, allowing the mould drum to be supported by the axle. E.g. the ring-shaped inner surfaces 3*b*, 6*b* of the flanges.

Figures 4A, 4B:
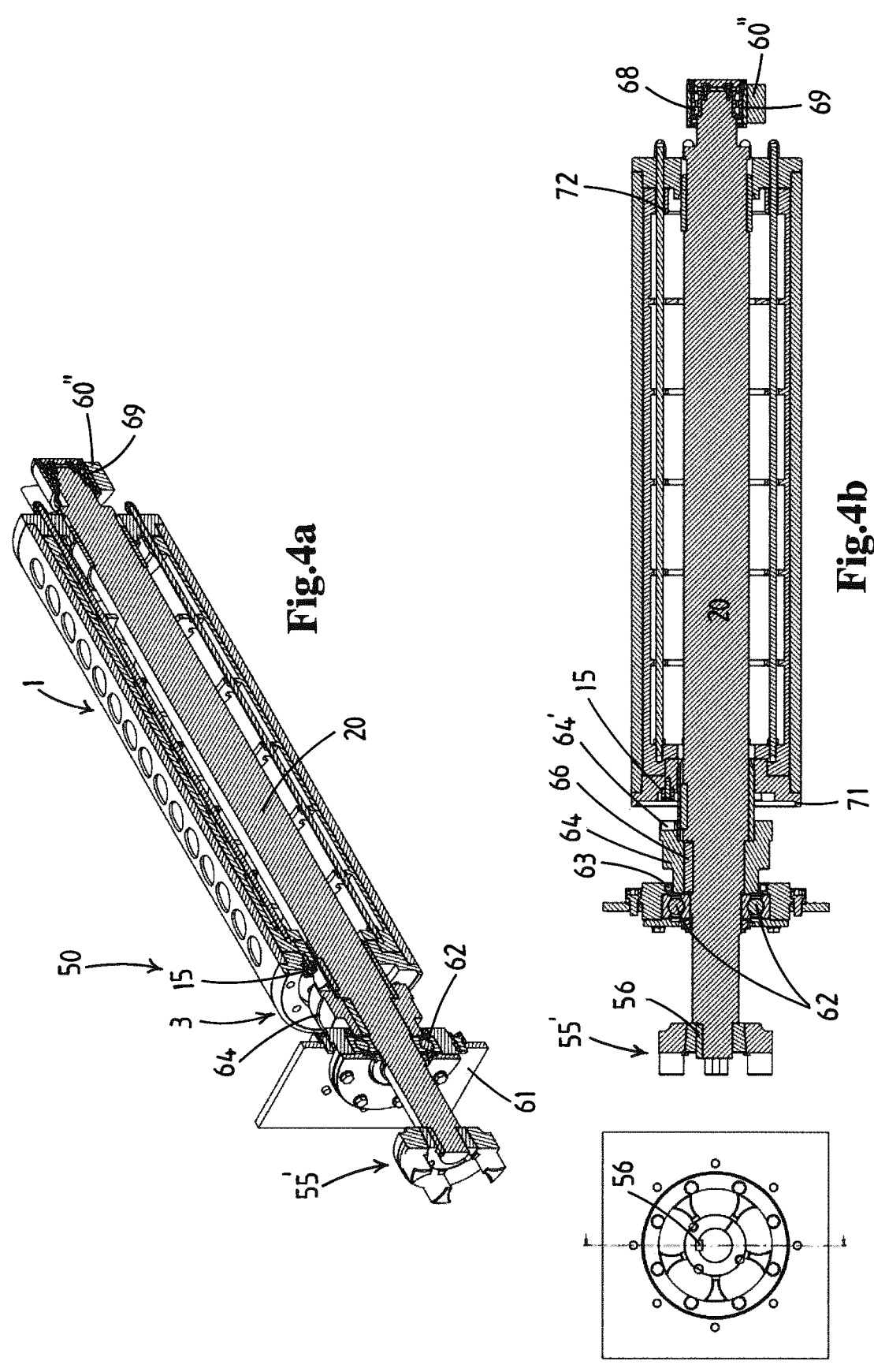
FIG. 4a shows the mould drum of FIG. 2a in a cross-
sectional perspective view in a system with a frame and a
mould drum drive member, during assembly.
FIG. 4b shows the system of FIG. 4a in cross section.

In FIGS. 4*a*, 4*b*, 5*a* and 5*b* part of the system 50 for moulding food products from a pumpable foodstuff mass of FIG. 1 is shown in more detail. In particular, the mould drum 1, the supporting axle 20 and a claw coupling member 55' are shown, which claw coupling member 55' allows coupling to the mould drum drive member 55 as visible in FIG. 1. In FIGS. 4*a* and 4*b* the system is shown during assembly, while in FIGS. 5*a* and 5*b* the system is assembled.

The claw coupling member 55' is fixed to axle 20 with a key 56. The axle is supported via a bearing, here roller bearing 62, by a frame part 61. Hence, the axle 20 is allowed to rotate about rotation axis R, via roller bearings 62, with respect to frame part 61. A bush 64 is fixed to axle 20 via a key 66. A seal 63 is provided between bush 64 and bearing 62.

In FIGS. 4*a* and 4*b*, it is visible that the bush 64 is at a distance from the driven flange structure 3. In particular in FIG. 4*b*, a recess 64' in the bush 64 is visible, matching the bushing 15 of the driven flange 3. Hence, in order to be able to drive the mould drum, the bushings 15 have to fall into the recesses 64' of the bush 64, as shown in FIGS. 5*a* and 5*b*.

Onto the axle 20 also sliding faces 71,72 are provided, allowing the mould drum 1 to be slid onto. In FIGS. 4*a* and 4*b*, the mould drum is partially slid onto the axle 20. In FIGS. 5*a* and 5*b*, the mould drum 1 is fully supported by the sliding faces 71, 72. In particular, support surface 3*b* of the flange 3 is fully supported by the sliding face 71.

At the end of the axle 20 opposite the mould drum drive member, a stationary part 69 is provided onto the axle 20 via a plain bearing 68. This stationary part 69 is held by the frame 60, e.g. supported by support surface 60'' and included by frame part 60'. The dimensions of the stationary part are such that the mould drum 1 is allowed to slide over this stationary part 69.

Figures 5A, 5B:
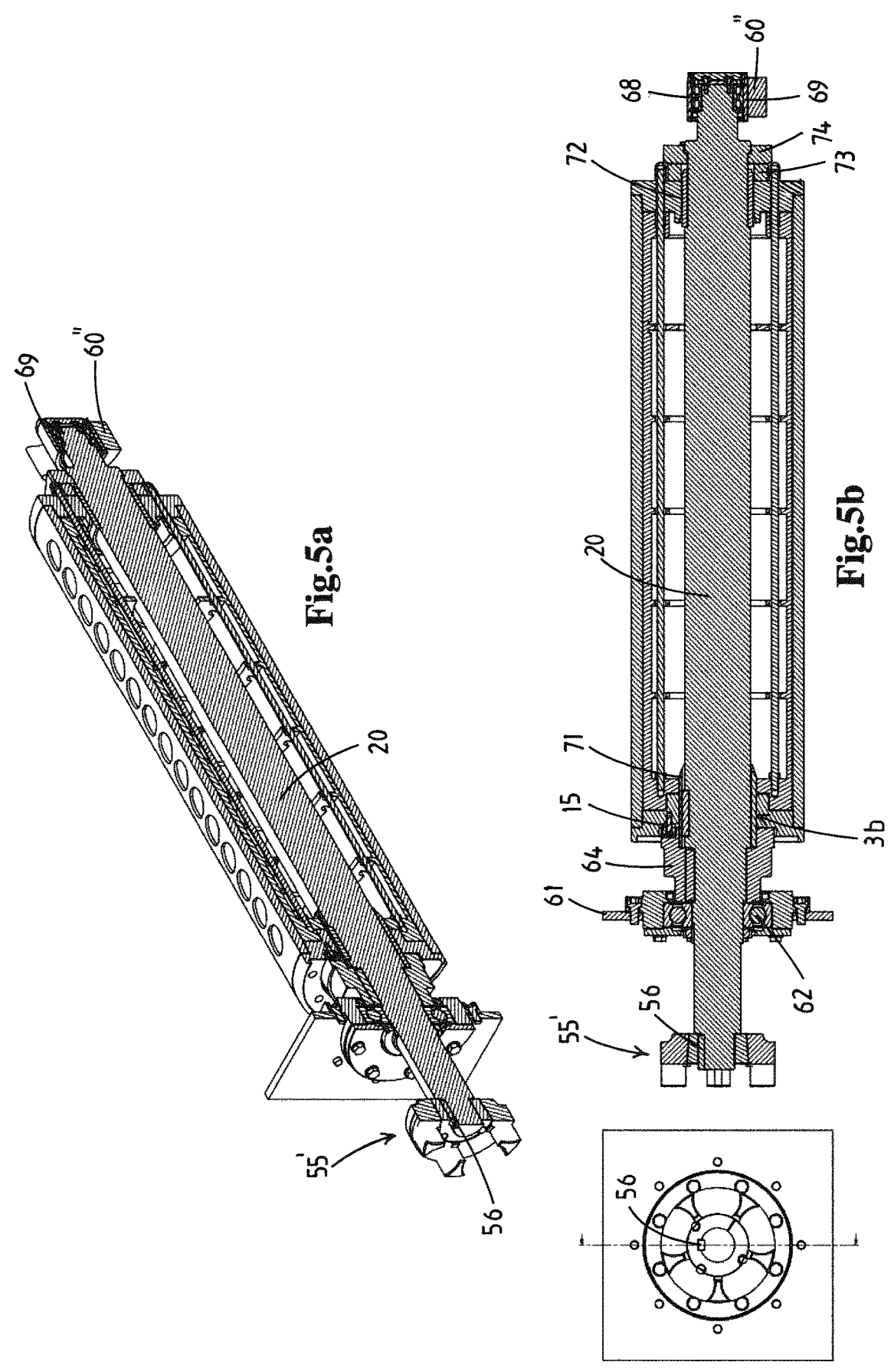
FIG. 5a shows the system of FIG. 4a after assembly.
FIG. 5b shows the system of FIG. 5a in cross section.

In FIGS. 5*a* and 5*b*, fixing members 73, 74 are visible, provided to fixate the mould drum 1 onto the axle 20 and prevent sliding of the mould drum off the axle 20.

Figures 6A, 6B:
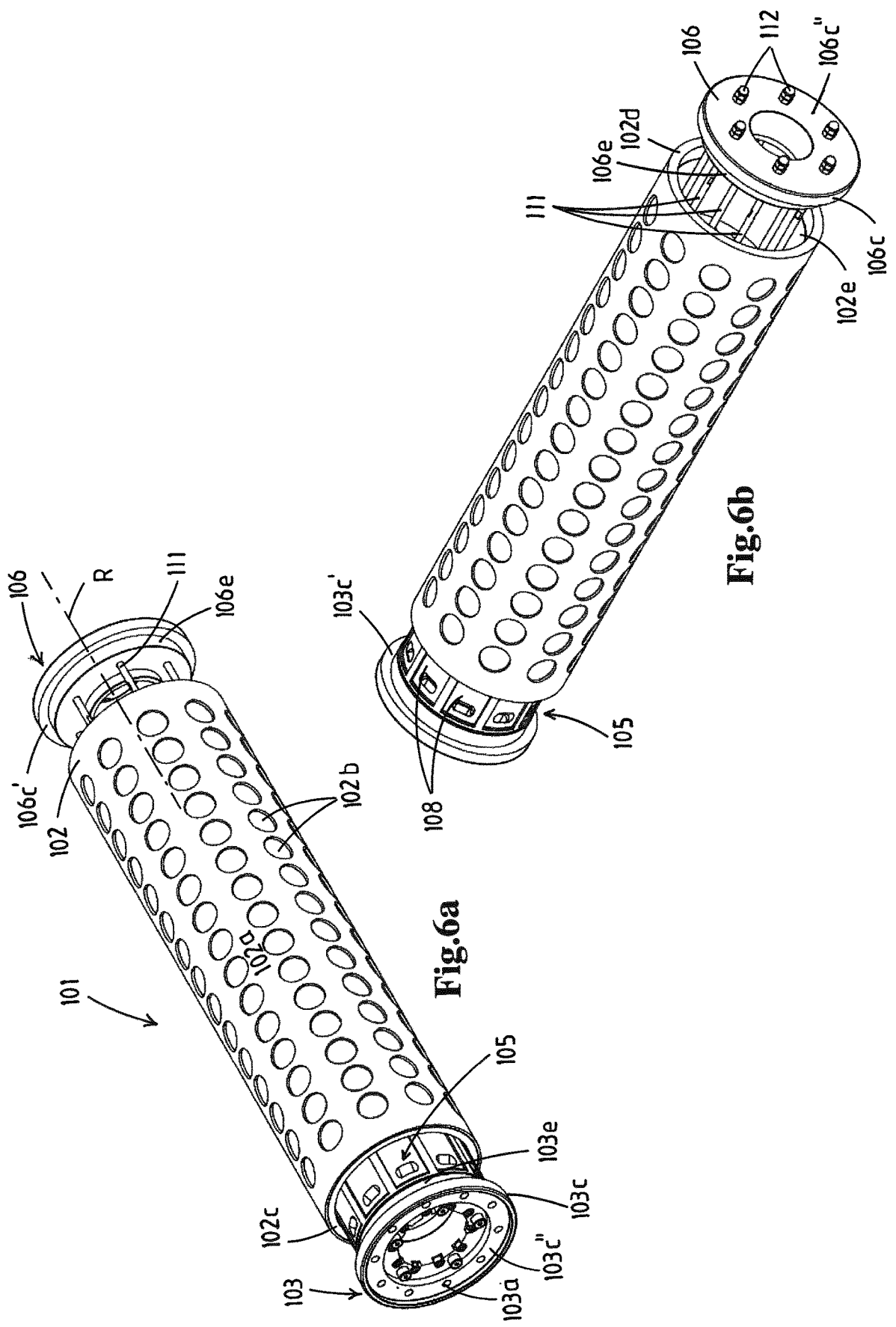
FIGS. 6a and 6b show perspective views of an alternative
mould drum according to the second aspect of the invention.

In FIGS. 6*a* and 6*b*, an alternative mould drum 101 according to a second aspect of the invention is shown in various views. Mould drum 101 is, similar to mould drum 1, configured for use in a system for moulding food products from a pumpable foodstuff mass. An example of such a system is shown in FIG. 1.

The mould drum 101 has a drum rotation axis R. The shown embodiment of the mould drum comprises an elongated, mould tube 102. The mould tube defines an outer circumferential surface 102*a*, wherein groups of multiple recessed mould cavities 102*b* are provided. The configuration of the mould cavities 102*b* is similar to that of the mould drum shown in FIGS. 2*a* and 2*b*.

The mould tube 102 has a first mould tube head end 102*c* and a second mould tube head end 102*d*. Opposite the outer circumferential surface 102*a* is an inner surface 102*e* of the mould tube.

The mould drum 101 further comprises a driven flange structure 103, which is arranged against the first mould tube head end 102c. The driven flange structure 103 is adapted to be driven by a mould drum drive member to rotate the mould tube about the drum rotation axis R.

In the shown embodiment, the driven flange structure 103 comprises a flange portion 103e which is adapted to extend inside the mould tube 102, in particular to be near an inner tube surface 102e opposite the outer circumferential surface 102a.

The driven flange structure 103 of the shown embodiment further comprises a cap portion 103c, having a diameter larger than the flange portion 103e so as to abut the first mould tube head end 102c. In particular, the cap portion 103c has an inner surface 103c', abutting the first mould tube head end 102c. In the shown configuration the diameter of the cap portion 103c equals the diameter of the mould tube, together forming an outer surface of the mould drum 101.

The mould drum 101 of the shown embodiment further comprises a support flange 106 to be arranged against the second mould tube head end 102d.

Similar to the driven flange structure 103, in the shown embodiment the support flange 106 comprises a flange portion 106e which is adapted to extend inside the mould tube 102, in particular to be near an inner tube surface 102e opposite the outer circumferential surface 102a.

The support flange 106 of the shown embodiment further comprises a cap portion 106c, having a diameter larger than the flange portion 106e so as to abut the second mould tube head end 102d. In particular, the cap portion 106c has an inner surface 106c', abutting the second mould tube head end 102d. In the shown configuration the diameter of the cap portion 106c equals the diameter of the mould tube 102, together forming an outer surface of the mould drum 101.

The shown mould drum further comprises a tubular inner member 105, which is provided inside the mould tube 102.

Figures 2A, 2B:
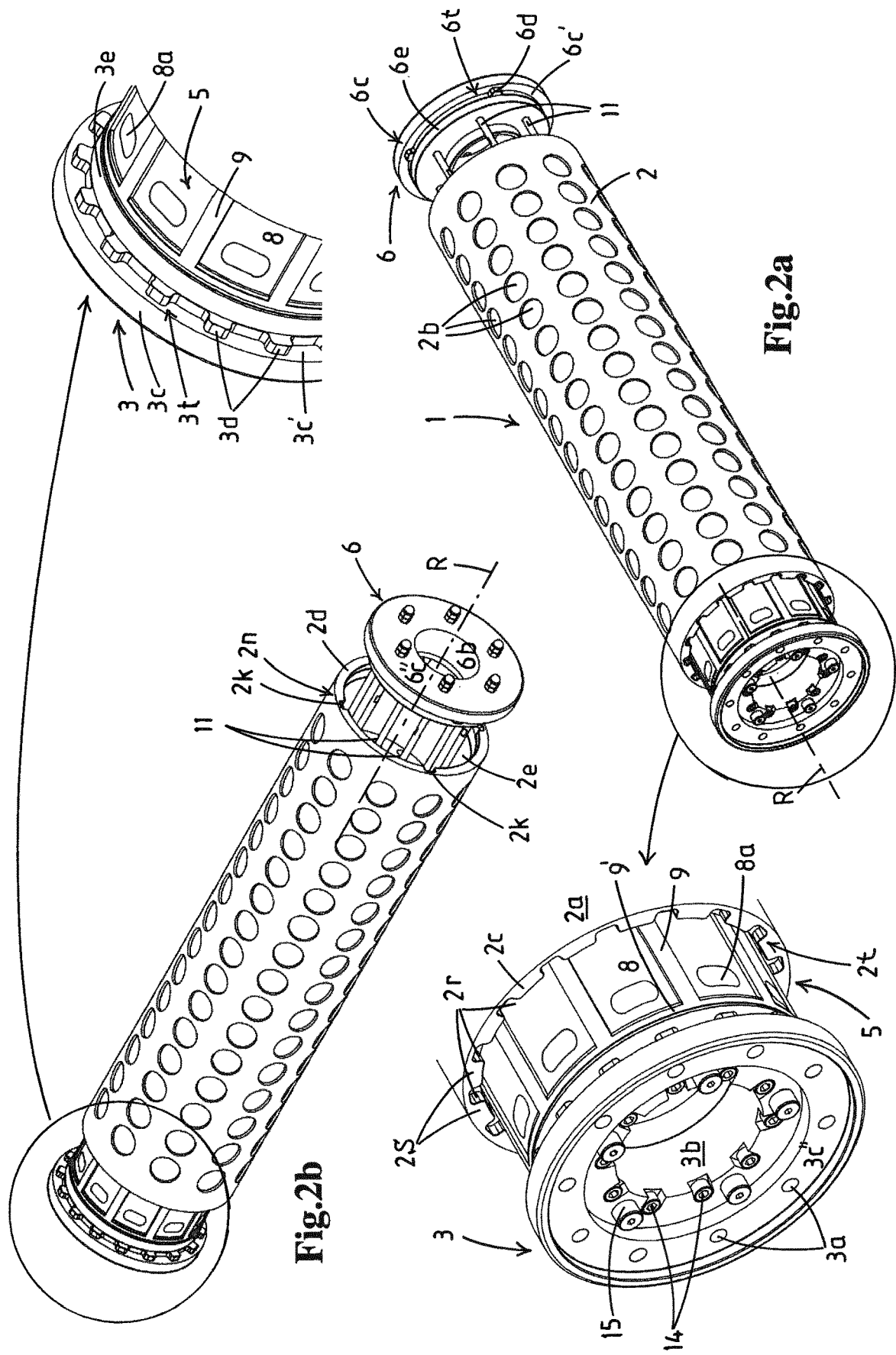
FIG. 2a shows a perspective view of a mould drum
according to both aspects of the invention during assembly,
with a detail shown in exploded view.
FIG. 2b shows an alternative perspective view of the
mould drum of FIG. 2a, with a detail shown in exploded
view.

Similar to the mould drum of FIGS. 2a and 2b, the fluid channels 108 are defined between the tubular inner member 105 and the mould tube 102. Similar to the mould drum of FIG. 2a, fluid inlets 103a provided in an outer surface 103c" of the cap portion 103c of the driven flange structure 103 are visible.

The mould tube 102 is to be sandwiched between the driven flange structure 103 and the support flange 106.

According to the second aspect of the invention, the mould drum 1 further comprises multiple tension rods 111, to be provided under pretension. In particular, in the shown embodiment, the tubular inner member 105 comprises a flange portion being attached to and forming part of the driven flange structure 103. The multiple tension rods 111 extend through the tubular inner member 105, between the driven flange structure 103 and the support flange 6.

Not visible in FIGS. 6a and 6b, but similar to the embodiments of FIGS. 2a and 2b, the tension rods 111 are fixed to the driven flange structure 103, in particular to the tubular inner member thereof. The tension rods 111 extend through the support flange 106, where they are mounted via bolts 112 to an outer surface 106c" of the support flange 6.

In the shown embodiment, no means are shown between the driven flange structure and the first mould tube head end to transfer torque from the driven flange to the mould tube. Examples of such means are dowels, pins, bolts, or connections such as welding, soldering, glue.

In FIGS. 7a-7e an alternative configuration of a driven flange structure 203 according to the first aspect of the invention is shown. The driven flange structure 203 is provided with a tooth profile 203t according to the first aspect of the invention, radially extending from a flange portion 203e of the driven flange structure. The tooth profile 203t is similar to the tooth profile 3t as shown in FIGS. 2a-3f. The tooth profile could also be replaced by other means to transfer torque from the driven flange structure to the mould tube.

The driven flange structure 203 comprises a cap portion 203c with an inner surface 3c' adapted to abut a mould tube head end. The driven flange structure 203 further comprises an inner portion 203f, provided adjacent the flange portion 203e, which inner portion 203f is adapted to extend inside a tubular inner member. Hence, the driven flange structure has a cap portion 203c having a large diameter, an adjoining flange portion 203e having a smaller diameter and extending into the mould tube, and an adjoining inner portion 203f having yet a smaller diameter and extending into the tubular inner member.

Figures 7A, 7B, 7C, 7D, 7E:
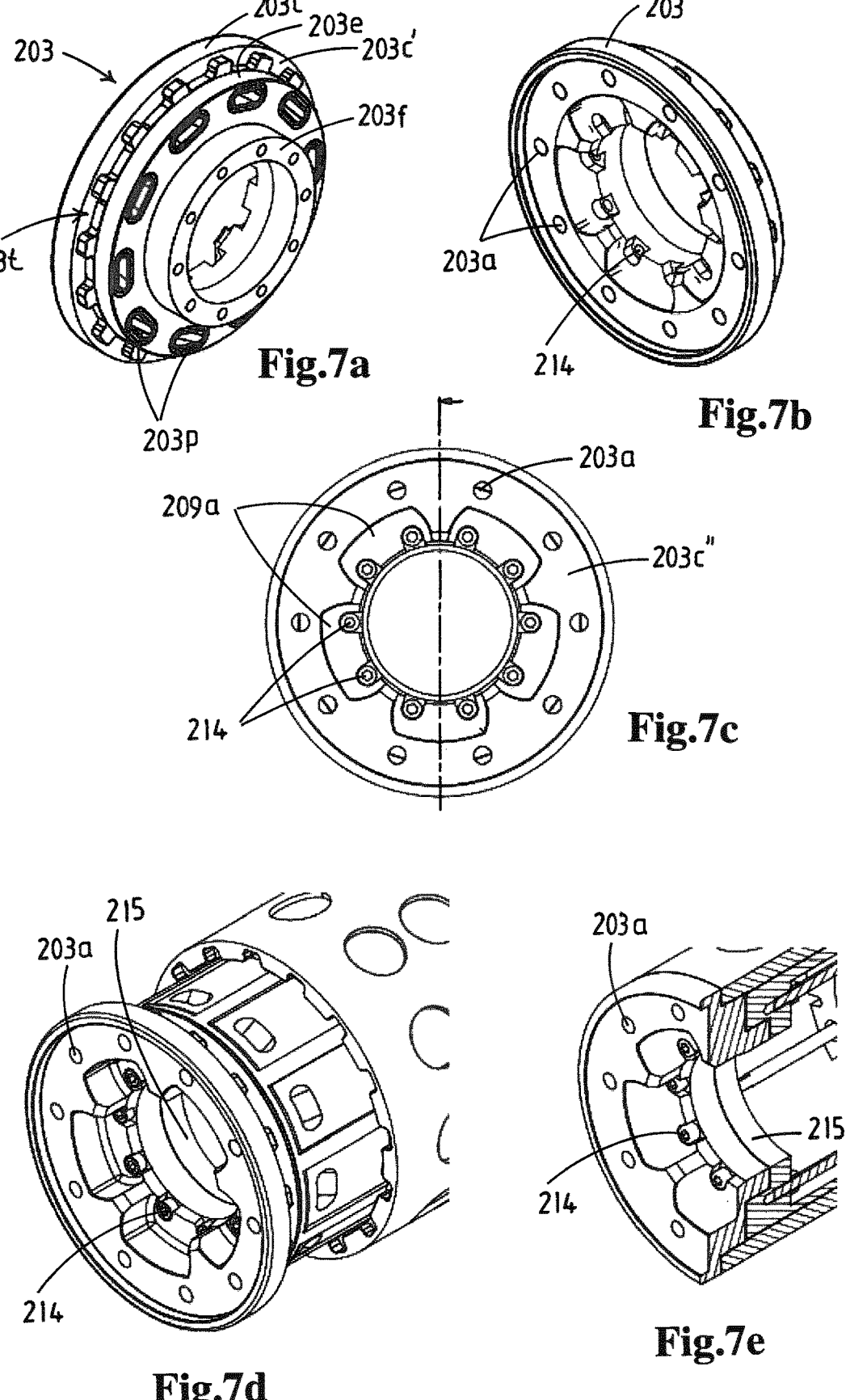
FIGS. 7a-7e show an alternative configuration of a driven
flange according to the first aspect of the invention.

Fluid inlets 203a are provided in an outer surface 203c" of the driven flange structure, similar to the fluid inlets 3a. These inlets 203a form the inlet of a fluid channel inside the driven flange structure 203, extending to outlets 203p. Furthermore, similar to the driven flange structure of FIG. 2a-3f, the driven flange structures 203 comprises connection bolts 214, to attach the driven flange structure 203 to an inner member 215. In FIG. 7a, only holes for the connection bolts 214 are visible.

The driven flange structure 203 does not have drive bushings, but comprises a collection of recesses 209a, adapted to be engaged by protrusions provided at a mould drum drive member, so as to provide a form closure or form attachment allowing to transfer torque from the mould drum drive to the driven flange structure.

The collection of recesses 209a of the shown embodiment has a flower-shape with five projections 209a, forming a regular pattern. This configuration is also referred to as a spider coupling. Configurations with less or more projections are also conceivable. The driven flange structure 203 allows a jaw coupling for transmitting torque. A particular advantage is that the mould drum drive member may be provided with an elastomer insert, commonly referred to as a spider, which allows the transmission of torque while damping system vibrations and accommodating misalignment, protecting the driven flange structure from damage.

Figure 8:
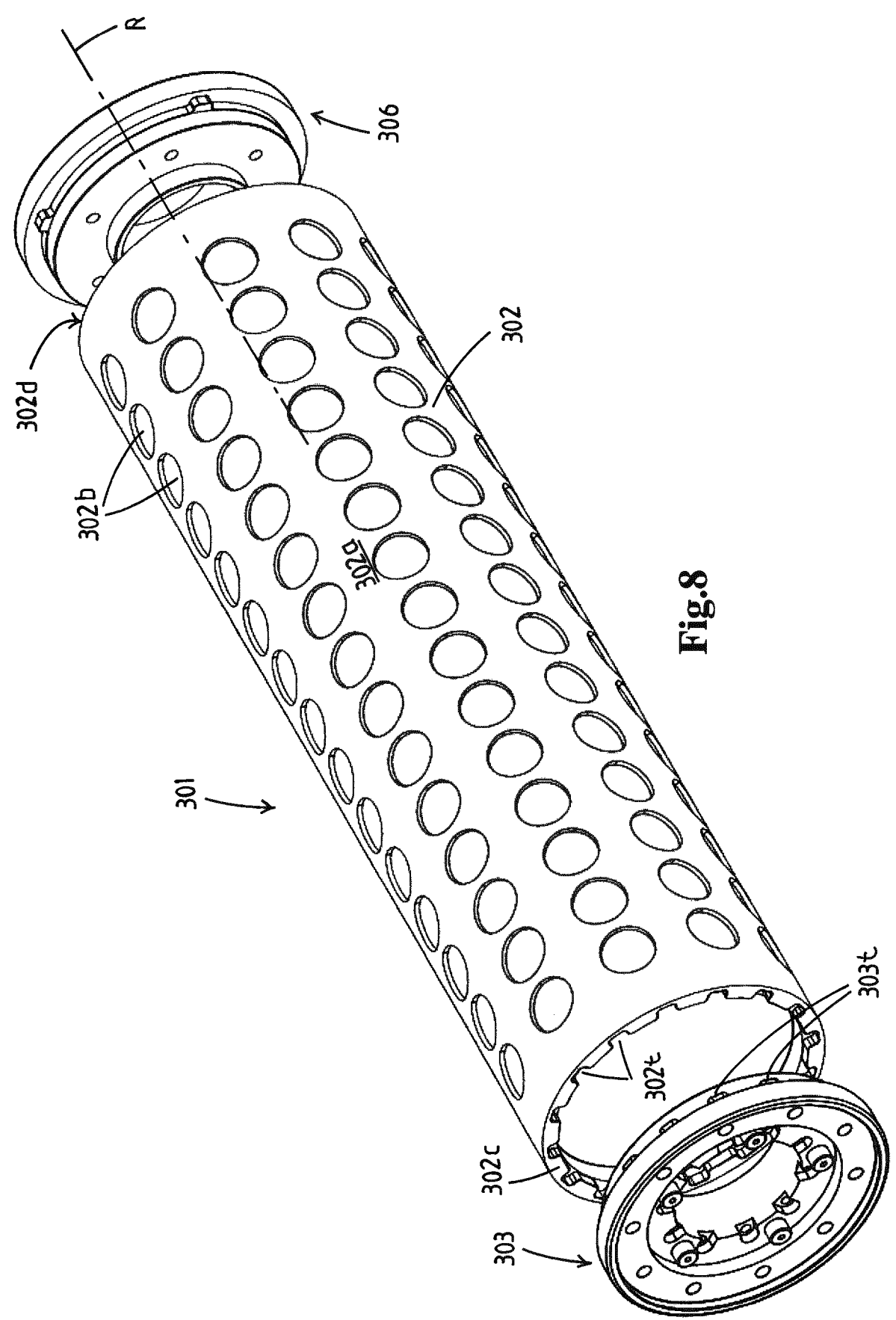
FIG. 8 shows a perspective view of an alternative mould
drum according to the first aspect of the invention.

FIG. 8 shows an alternative mould drum 301 according to the first aspect of the invention is shown. Similar to mould drum 1 of FIGS. 2a-3f, the mould drum 301 comprises a mould tube 302 defining an outer circumferential surface 302a wherein groups of multiple recessed mould cavities 302b are provided. The mould tube 302 has a first mould tube head end 302c and second mould tube head end 302d.

A driven flange structure 303 is to be arranged against the first mould tube head end 302c, which is adapted to be driven by a mould drum drive member similar to that as shown in FIG. 1, to rotate the mould tube about a drum rotation axis R. A support flange 306 is arranged against the second mould tube head end 302d, such that the mould tube 302 is sandwiched between the driven flange structure 303 and the support flange 306.

According to the first aspect of the invention, the driven flange structure 303 is provided with a tooth profile 303t, and the mould tube 302 is provided with a meshing tooth profile 302t, both tooth profiles meshing with each other and thereby being able to transfer torque from the driven flange structure 303 to the mould tube 302. The configuration of the meshing teeth of the driven flange structure 303 and the mould tube 302 is similar to that of driven flange structure 3 of FIGS. 2a-3f.

The mould tube 302 of the presently shown embodiment is of a structure that does not require support of a tubular inner member.

Figures 9A, 9B:
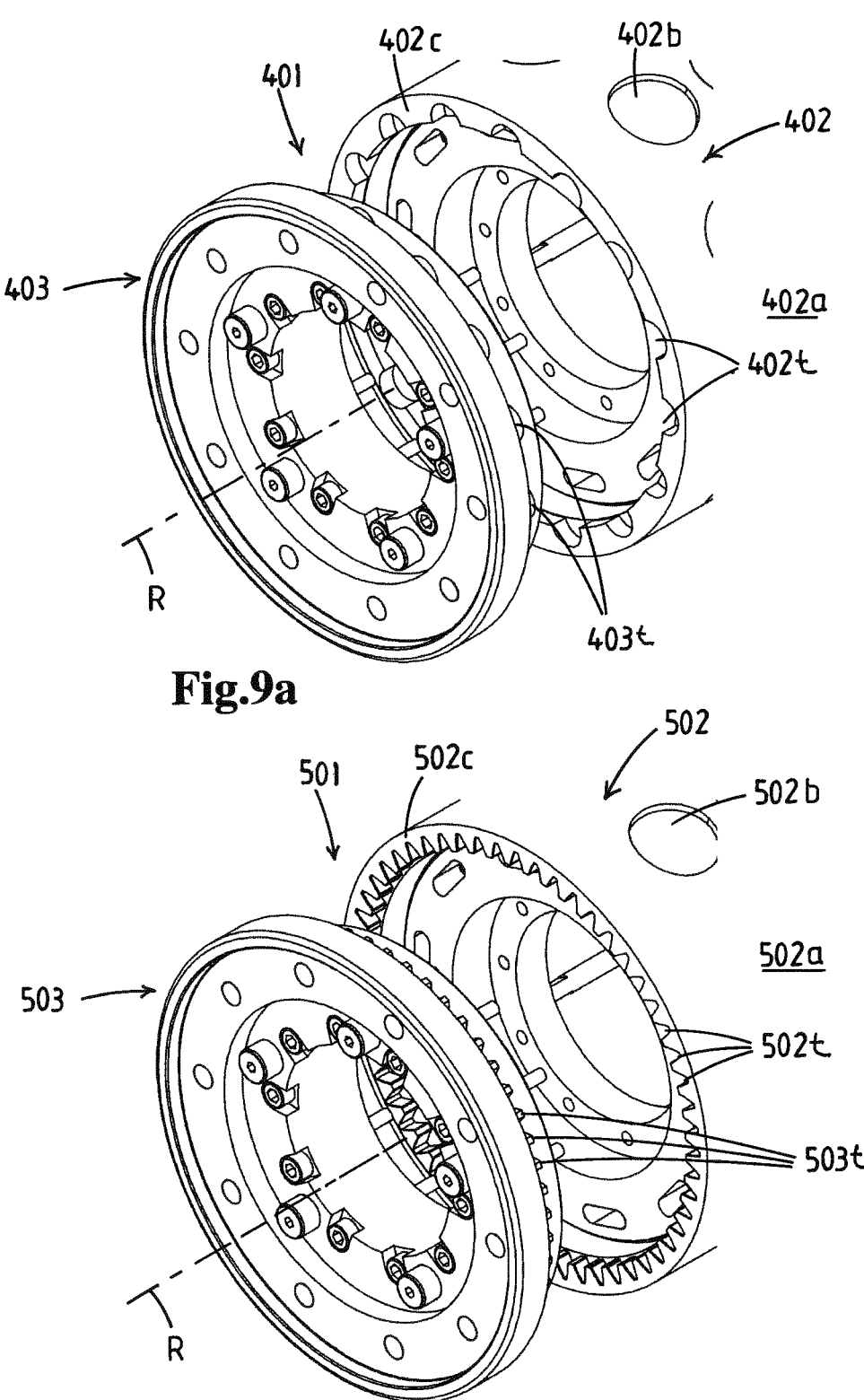
FIGS. 9a and 9b show in perspective view details of
alternative mould drums according to the first aspect of the
invention.

In FIGS. 9*a* and 9*b* only parts of mould drums 401 and 501 according to the first aspect of the invention are shown Similar to mould drum 1 of FIGS. 2*a*-3*f*, the mould drums 401, 501 comprise a mould tube 402, 502 defining an outer circumferential surface 402*a*, 502*a* wherein groups of multiple recessed mould cavities 402*b*, 502*b* are provided. The mould tube has a first mould tube head end 402*c*, 502*c* and second mould tube head end (not visible).

A driven flange structure 403, 503 is to be arranged against the first mould tube head end 402*c*, 502*c*, which is adapted to be driven by a mould drum drive member similar to that as shown in FIG. 1, to rotate the mould tube about a drum rotation axis R.

According to the first aspect of the invention, the driven flange structure 403 is provided with a tooth profile 403*t*, and the mould tube 402 is provided with a meshing tooth profile 402*t*, both tooth profiles meshing with each other and thereby being able to transfer torque from the driven flange structure 403 to the mould tube 402. The configuration of the meshing teeth of the driven flange structure 403 and the mould tube 402 of FIG. 9*a* is distinct from that of driven flange structure 3 of FIGS. 2*a*-3*f*.

Also driven flange structure 503 is provided with a tooth profile 503*t*, and the mould tube 502 is provided with a meshing tooth profile 502*t*, both tooth profiles meshing with each other and thereby being able to transfer torque from the driven flange structure 503 to the mould tube 502. The configuration of the meshing teeth of the driven flange structure 503 and the mould tube 502 of FIG. 9*b* is distinct from that of driven flange structure 3 of FIGS. 2*a*-3*f*, and to that of FIG. 9*a*.

The invention claimed is:

1. A mould drum configured for use in a system for moulding food products from a pumpable foodstuff mass, the mould drum comprising:
   a mould tube made of porous material, the mould tube defining an outer circumferential surface wherein groups of multiple recessed mould cavities are provided, the mould tube having a first and second mould tube head end;
   a driven flange structure arranged against the first mould tube head end, which is adapted to be driven by a mould drum drive member to rotate the mould tube about a drum rotation axis;
   wherein the driven flange structure is provided with a tooth profile, and the mould tube is provided with a meshing tooth profile, both tooth profiles meshing with each other and thereby being able to transfer torque from the driven flange structure to the mould tube wherein the meshing tooth profile provided in the mould tube is formed by a series of recesses made in the porous material of the mould tube, provided in an inner tube surface opposite the outer circumferential surface, and being concealed by the outer circumferential surface.

2. The mould drum according to claim 1, wherein the driven flange structure comprises a flange portion extending inside the mould tube, the tooth profile being formed by a series of protrusions, radially extending from the flange portion of the driven flange structure.

3. The mould drum according to claim 2, the driven flange structure also comprising a cap portion having a diameter larger than the protrusions so as to abut the first mould tube head end and conceal one side of the tooth profile.

4. The mould drum according to claim 1, wherein the driven flange structure is provided with drive bushings, adapted to be engaged by the mould drum drive member.

5. The mould drum according to claim 1, wherein the mould drum is provided with a support surface, allowing the mould drum to be supported by a rotatable axle.

6. The mould drum according to claim 1, further comprising a support flange arranged against the second mould tube head end,
   wherein the support flange is provided with a tooth profile, and the second mould tube head end is provided with a meshing tooth profile, both tooth profiles meshing with each other.

7. The mould drum according to claim 1, further comprising a tubular inner member provided inside the mould tube.

8. The mould drum according to claim 7, the tubular inner member comprising a flange portion being attached to and forming part of the driven flange structure.

9. The mould drum according to claim 1, further comprising:
   a support flange arranged against the second mould tube head end, such that the mould tube is sandwiched between the driven flange structure and the support flange; and
   multiple tension rods, provided under pretension, extending between the driven flange structure and the support flange.

10. A system for moulding food products from a pumpable foodstuff mass, which system comprises:
   a frame,
   a mould drum according to claim 1, being rotatably supported by the frame about the drum rotation axis,
   a mould drum drive member which, in operation, drives the driven flange structure to rotate the mould drum.

11. The system according to claim 10, further comprising a mass feed member which, in operation, is arranged at a fill position relative to the outer circumferential surface of the mould tube, said mass feed member being adapted to transfer foodstuff mass into passing mould cavities of the mould drum, said mass forming a food product in said mould cavity.

12. A method for moulding food products from a pumpable foodstuff mass, wherein use is made of a system for moulding food products from a pumpable foodstuff mass according to claim 10.

13. A method for configuring a mould drum according to claim 1 for use in a system for moulding products from a pumpable foodstuff mass, the method comprising the steps of:
   providing a driven flange structure with a tooth profile, which driven flange structure is adapted to be driven by a mould drum drive member to rotate the mould tube about a drum rotation axis;
   providing a mould tube made of porous material, the mould tube defining an outer circumferential surface wherein groups of multiple recessed mould cavities are provided, the mould tube having a first and second mould tube head end, the mould tube being provided with a meshing tooth profile, the meshing tooth profile being formed by a series of recesses made in the porous material of the mould tube, provided in an inner tube surface opposite the outer circumferential surface, and being concealed by the outer circumferential surface;
   arranging the driven flange structure against the first mould tube head end, such that the tooth profile of the driven flange structure and the tooth profile of the first mould tube head end mesh with each other, and thereby being able to transfer torque from the driven flange structure to the mould tube.

* * * * *